(12) United States Patent
Leijon et al.

(10) Patent No.: US 7,164,212 B2
(45) Date of Patent: Jan. 16, 2007

(54) ELECTRIC DEVICE AND METHOD

(75) Inventors: Mats Leijon, Uppsala (SE); Hans Bernhoff, Uppsala (SE)

(73) Assignee: Swedish Seabased Energy AB, Uppsala (SE)

( * ) Notice: Subject to any disclaimer, the term of this patent is extended or adjusted under 35 U.S.C. 154(b) by 8 days.

(21) Appl. No.: 10/337,411

(22) Filed: Jan. 7, 2003

(65) Prior Publication Data
US 2004/0251692 A1 Dec. 16, 2004

(30) Foreign Application Priority Data
Jan. 10, 2002 (SE) .................................. 0200065

(51) Int. Cl.
F03B 13/10 (2006.01)
F03B 13/12 (2006.01)
H02P 9/04 (2006.01)

(52) U.S. Cl. ........................................ 290/42; 290/53
(58) Field of Classification Search ................ 290/42, 290/43, 53, 54
See application file for complete search history.

(56) References Cited

U.S. PATENT DOCUMENTS

| | | | | |
|---|---|---|---|---|
| 3,362,336 A | * | 1/1968 | Kafka | 417/331 |
| 4,249,084 A | * | 2/1981 | Villanueva et al. | 290/53 |
| 4,389,843 A | * | 6/1983 | Lamberti | 60/507 |
| 4,539,485 A | * | 9/1985 | Neuenschwander | 290/53 |
| 4,754,157 A | * | 6/1988 | Windle | 290/53 |
| 5,146,123 A | * | 9/1992 | Yarr | 310/15 |
| 5,929,541 A | * | 7/1999 | Naito et al. | 310/12 |
| 6,020,653 A | * | 2/2000 | Woodbridge et al. | 290/53 |
| 6,229,225 B1 | * | 5/2001 | Carroll | 290/53 |
| 6,236,124 B1 | * | 5/2001 | Sekiyama et al. | 310/12 |
| 6,392,314 B1 | * | 5/2002 | Dick | 290/53 |
| 6,791,205 B1 | * | 9/2004 | Woodbridge | 290/53 |
| 2002/0145288 A1 | * | 10/2002 | Van Breems | 290/42 |

FOREIGN PATENT DOCUMENTS

| | | | |
|---|---|---|---|
| GB | 2272026 A | * | 4/1994 |
| JP | 55-160967 | * | 5/1979 |
| WO | 0106119 | | 1/2001 |

* cited by examiner

Primary Examiner—Julio Gonzalez
(74) Attorney, Agent, or Firm—Dykema Gossett PLLC

(57) ABSTRACT

The present invention relates to a wave-power unit having a floating body (3) which is connected by a connection means (4) to the rotor (7) of an electric linear generator (5). The stator (6) is anchored in the sea bed (1). In accordance with the invention the rotor (7) is permanently magnetic and the stator (6) comprises winding forming a plurality of poles distributed in the direction of movement of the rotor. The invention also relates to a wave-power plant composed of a number of wave-power units in accordance with the invention. The invention also relates to the use of the claimed wave-power unit, a method of generating electric energy, a system of components for the manufacture of a linear generator for a wave-power unit in accordance with the invention, and to a method of manufacturing such a linear generator.

51 Claims, 8 Drawing Sheets

ELECTRIC DEVICE AND METHOD

TECHNICAL FIELD

A first aspect of the present invention relates to a wave-power unit for the production of electric power of a type comprising a floating body and an electric linear generator whose rotor by connection means is connected to the floating body and whose stator is arranged to be anchored in the bed of a sea/lake.

Another aspect of the invention relates to a wave-power plant comprising a plurality of wave-power units in accordance with the invention.

A third aspect of the invention relates to the use of the claimed wave-power unit for producing electric current.

A fourth aspect of the invention relates to a method of generating electric power by connecting a floating body to the rotor of an electric linear generator and anchoring the stator of the generator in the sea or lake bed.

A fifth aspect of the invention relates to a system of components for manufacturing a linear generator for a wave-power unit in accordance with the invention.

Finally, a sixth aspect of the invention relates to a method of manufacturing a linear generator for a wave-power plant in accordance with the invention.

In the present application the term "rotor" is used for the movable part of the linear generator. It should therefore be understood that the term "rotor" does not relate to a rotating body but to a body moving linearly to and fro. The "direction of movement of the rotor" thus refers to its linear direction of movement. The "centre line" of the rotor refers to the line passing through the centre in an optional cross section through the rotor and running in the direction of movement, the "cross section" referring to a section transverse to the direction of movement of the rotor.

The wave-power unit in accordance with the invention is primarily intended for, but not limited to, applications up to 500 kW.

BACKGROUND ART

Wave movement in the sea and in large inland lakes constitutes a potential source of energy that has scarcely been exploited so far. The available wave energy is dependent on the height of the waves, and naturally differs in different locations. The average wave energy during a year is dependent on the various wind conditions, which are greatly influenced by the distance of the location from the nearest coast. Measurements have been carried out in the North Sea, for instance. At one measuring point approximately 100 km west of the coast of Jylland, Denmark, where the depth was about 50 m, wave heights were measured over a long period of time and the available energy was calculated. The following table was obtained:

| Height of wave m | Wave period sec. | Output kW/m | Hours/Year |
|---|---|---|---|
| <0.5 | — | — | 966 |
| 1 | 4 | 2 | 4103 |
| 2 | 5 | 12 | 1982 |
| 3 | 6 | 32 | 944 |
| 4 | 7 | 66 | 445 |
| 5 | 8 | 115 | 211 |
| >5.5 |  | >145 | 119 |

Thus, during slightly less than half the time the height of the waves is about 1 m, producing an output of 2 kW/m. However, the most energy is available from wave heights in the region of 2–5 meter, taking into consideration that the output increases greatly with increased wave height.

Various types of wave-power units have been proposed to utilize the energy available from the wave movement in the ocean for generating electric power. However, these have been unsuccessful in competing with conventional production of electric power. Wave-power plants realized so far have been primarily experimental plants or have been used to supply power locally for navigation buoys. If commercial production of electricity is to be possible, thus providing access to the vast reserve of energy in the movement of ocean waves, is it not only necessary to place the units in suitable spots, t is also necessary for the unit to be reliable in operation, highly efficient and low in manufacturing and running costs.

Amongst feasible principles for converting wave-movement energy into electric power, therefore, a linear generator probably satisfies these requirements to the greatest extent.

The vertical movements of the floating body, caused by the wave movement can thus be converted directly to a to-and-fro movement of the rotor of the generator. A linear generator can be constructed to be extremely robust and simple and since it is anchored at the sea bed it will be stable and unaffected by currents in the water. The only movable part of the generator is the rotor moving to and fro. Storage problems are substantially eliminated. The unit will be extremely reliable in operation thanks to its few movable parts and simple construction.

U.S. Pat. No. 6,020,653, for instance, reveals a wave-power unit based on the linear generator principle to be already known. The publication thus describes a generator anchored to the sea bed, which produces electric energy from the wave movement at the surface of the sea. A generator coil is connected to a floating body so that the coil moves up and down with the movements of the waves. A magnetic field acts on the coil when it moves so that an electromagnetic force is generated therein. The magnetic field is such that it produces a uniform field with simple magnetic orientation along the entire stroke length of the coil. The generator comprises a base plate on the sea bed, which supports the magnetic core in which the coil moves.

A wave-power unit provided with an electronic linear generator is also known through U.S. Pat. No. 4,539,485. Its rotor consists of a number of permanent magnets and the winding of the generator is arranged in the surrounding stator. A great drawback is that the stator winding consists of a single coil. It therefore has no poles. This means that the induced current will have extremely low frequency since the linear movement of the rotor is slow.

The object of the present invention is to produce a wave-power unit of the relevant type which to a greater extent fulfils the demands for reliable operation, simplicity and cost effectiveness.

DESCRIPTION OF THE INVENTION

The objective set has been achieved in accordance with the first aspect of the invention in that the wave-power unit described in the preamble to claim 1 comprises the special features that the rotor is permanently magnetic and that the stator comprises a winding forming a plurality of poles distributed in the direction of movement of the rotor. Accommodating the winding in the stator and making the rotor permanently magnetic enables the simplest possible construction of the movable parts of the unit, thereby reducing costs and also the risk of disturbances. It is also simpler to design the winding and pass on the current when the winding is placed in the stator. Thanks also to a plurality of poles being arranged one after the other, the frequency of the induced current can be increased, which is a considerable advantage in view of the fact that the frequency of the to-and-fro movement is low. The claimed wave-power unit thus offers a financially competitive method of extracting electric power from waves. The stator may be arranged either on the outside or the inside of the rotor. In most cases it is preferable for it to be on the outside. A combination of these variants is also feasible within the scope of the invention.

In accordance with a preferred embodiment of the claimed wave-power unit the rotor is vertically oriented.

Since the rotor may be oriented either horizontally or inclined, vertical orientation is in most cases the most practical.

In accordance with another preferred embodiment the rotor comprises a plurality of permanent magnets distributed in the direction of movement of the rotor.

A rotor so designed gives optimum cooperation with a linear generator in which the stator is designed in accordance with the invention.

In accordance with yet another preferred embodiment the distance between the poles is less than 50 mm, preferably less than 10 mm.

The smaller the pole distance the higher will be the frequency achieved. If the waves are 1 m high the average linear speed of the rotor will be approximately 0.5 m/s and if the waves are 2 m high the average speed will be about 0.8 m/s. With a pole pitch of 50 mm, thus, frequencies in the order of 10–15 Hz are obtained for waves 1–2 m high. With a pole pitch of 10 mm the frequency will be five times greater. A practically suitable pole pitch is about 8 mm.

In accordance with another preferred embodiment the stator comprises a plurality of laminated stacks distributed evenly around the rotor.

This enables the greatest possible part of the magnetic field to be utilized for inducing current.

In accordance with yet another preferred embodiment the rotor is shaped as a regular polygon and the number of laminated stacks is equal to the number of sides of the polygon.

With such an embodiment a structurally simple optimization is obtained for exploiting the magnetic field for inducing current.

In accordance with still another preferred embodiment each laminated stack is composed of a plurality of modules arranged one after the other in the direction of movement of the rotor.

Thanks to the modular construction the stator of the linear generator can easily be adjusted to a length suited to the conditions in a particular case. Units of different sizes can thus be constructed using standard components. This contributes further to reducing the manufacturing costs. It also enables an existing plant to be easily modified. Each module may comprise one or more poles.

In accordance with a further embodiment the rotor comprises a plurality of permanent magnets distributed around its circumference and so arranged that in an optional cross section of the rotor one permanent magnet faces towards each laminated stack. Arranging permanent magnets facing in every direction where there is a laminated stack for the magnets to cooperate with further increases utilization of the movement for inducing current.

In accordance with an additional embodiment the rotor comprises a rotor body on which the magnets are mounted.

This embodiment creates opportunity for achieving a simple and inexpensive rotor since the permanent magnets may consist of uniform standard components, an optional number of which can be distributed along and around the rotor, the same standard components being used for rotors of different length and cross section.

In accordance with yet another preferred embodiment the length of the rotor and that of the stator differ from each other by a factor of two or more.

This facilitates maximum induced current during the full stroke length of the rotor.

In accordance with another preferred embodiment the rotor is longer than the stator.

This is probably normally the most suitable way to make use of the full stroke length of the rotor.

In accordance with yet another preferred embodiment one or more guide elements is/are arranged to control the rotor. Such control ensures that, using relatively simple means, a tolerably exact path of movement for the rotor is obtained. It allows the air gap to be very small, in the order of a mm or so, so that the losses are minimized.

In accordance with a further advantageous embodiment at least a part of the connection means is flexible.

This avoids laterally directed wave forces on the floating body being transmitted with full force to the rotor of the generator. Its control can therefore be dimensioned to be relatively weak since the deflection forces will be moderate.

In accordance with another preferred embodiment the connection means comprises a cable, wire or chain.

The flexibility striven for in the connection means is thus achieved in an expedient and constructionally simple manner. The cable, wire or chain may extend all the way from the floating body to the rotor or it may constitute only a part of the connection means. Alternatively, flexibility can be achieved by the connection means being rigid but provided with universal joints.

In accordance with yet another preferred embodiment the unit comprises spring means arranged to exert a vertical force on the rotor. This ensures that the downwardly directed stroke of the rotor occurs with full speed corresponding to the speed at which the surface of the water drops. This is significant if the mass of the rotor is relatively slight so that slack might otherwise occur in the cable. Although the most important job of the spring means is to effect a downwardly directed force, in certain cases it may be expedient for it to be arranged to also act with an upwardly directed force.

In accordance with yet another preferred embodiment the spring rate of the spring means is adjustable.

By varying the spring rate it can be adjusted to the frequency of the wave movements so that resonance is obtained. By "spring rate" is meant the resultant constant if the spring means is composed of several spring elements. Normally the spring rate is set to a value corresponding to the resonance frequency for the type of waves expected to occur during most of the time.

In accordance with yet another preferred embodiment the length of the connection means is adjustable.

This allows, for instance, for adjustment to different levels of the surface of the sea/lake as in the case of tidal waters.

In accordance with yet another preferred embodiment the unit comprises a gear mechanism that produces a gear ratio between the movement of the floating body and that of the rotor.

Thanks to the gear mechanism the rotor can be given a speed several times greater than that of the floating body. An alternative or supplementary opportunity is thus created for increasing the frequency of the induced current, which is particularly desirable in the case of multiphase generators.

From a design aspect it is practical to arrange the gear mechanism where the connection means joins the rotor. This constitutes an additional advantageous embodiment of the invention.

In accordance with yet another preferred embodiment the linear generator is secured to a base plate arranged to rest on the bed of the sea/lake.

Since the linear generator per se can be anchored so that it is located far above the surface of the sea this embodiment could no doubt be realized very much more simply. It also offers high stability.

In accordance with yet another preferred embodiment the stator is supported by a stand so designed that it forms a central free space of sufficient cross-sectional dimensions to permit the rotor to enter the space, which space is at least as high as the rotor is long.

The embodiment allows the movement of the rotor to continue past the whole stator so that the full length of the stator is used to induce current.

In accordance with yet another preferred embodiment the linear generator is enclosed in a watertight housing.

The enclosure prevents the generator from being subjected to the influence of salt water or living organisms in the water such as acorn barnacles. The components can then be designed with lower demands for quality as regards their ability to withstand salt water, and can therefore be made more cheaply.

In accordance with yet another preferred embodiment the housing is filled with a liquid.

This embodiment is particularly significant if the generator is placed in relatively deep water since the pressure difference would otherwise make it complicated to ensure that the housing was sufficiently watertight. If the housing is filled with a liquid of a type less aggressive than salt water, the risk is substantially eliminated of it later penetrating, even with comparatively simple bushings on the housing. The generator is also cooled by the liquid. The liquid should suitably have the same pressure as the surroundings.

In accordance with yet another advantageous embodiment the base plate, stand and/or housing is/are primarily made of concrete. Concrete is the cheapest possible material that could be used in this context. Furthermore, in many cases it is important for the unit to have a high ballast weight and the material costs are then of considerable significance.

In accordance with yet another preferred embodiment the stator is at least partially embedded in a solid material and/or the rotor is at least partially embedded in a solid material. The material is suitably concrete.

This means that the embedded components are effectively protected from the surrounding salt water. In certain cases this embodiment may be a suitable alternative to enclosing the whole generator in a housing, whereupon sealing problems are substantially eliminated.

In accordance with yet another preferred embodiment the rotor is hollow and is provided with permanent magnets directed both outwardly and inwardly and laminated stacks are arranged on both the outside and the inside of the rotor.

This embodiment maximally exploits the stator's ability to induce current since the inwardly directed magnetic field is also utilized.

In accordance with yet another preferred embodiment the floating body is connected by the connection means to a plurality of linear generators.

Such duplication or multiplication on the generator side may in certain cases lead to a totally more economic unit and increases the feasibility of basing the design on the module principle since each linear generator can be an entirely standard unit and, depending on the locality, a suitable number can be connected to one and the same floating body.

In accordance with yet another preferred embodiment the stator windings are connected to a rectifier. This rectifier is suitably arranged close to the linear generator below the surface of the water.

In accordance with yet another preferred embodiment the generator is arranged to produce a voltage of varying frequency. This is because, after being rectified, the output signal is a bipolar DC voltage.

The generator is thus suited to the movement pattern created in the rotor by the wave movements, the speed varying depending on where in a wave cycle the floating body is and on superimposed variations in the movement of the wave surface.

The advantageous embodiments of the claimed wave-power unit described above are defined in the claims dependent on claim 1.

The claimed wave-power unit is well suited for combination with several similar units to form a wave-power plant. The second aspect of the invention thus relates to such a power plant wherein the stator winding of each wave-power unit is connected via a rectifier to an inverter which is common to a plurality of wave-power units, which inverter is arranged to supply energy to an electric supply network.

The claimed wave-power plant provides a practically realizable solution for a system to produce electric current on a larger scale using units of the type claimed, thereby exploiting their advantages, and in which the conversion to DC and then AC creates favourable transmission conditions.

In accordance with a preferred embodiment of the claimed wave-power plant at least one electric switchgear station is connected to the wave-power unit, which switchgear station comprises a watertight container enclosing switchgear components, which container is anchored in the sea bed.

In order to obtain economic energy production from generator units at sea that utilize wave movement, it is important to effect technical optimization not only of the generator unit but also of the complete system required to transmit the energy from each energy source to an electric network for transmission and distribution. An important aspect here is that the wave-power plant is located some distance off shore, which distance is sometimes considerable.

Thanks to its connection to a switchgear station so designed, it can be placed close to the generator unit. This minimizes losses and enables the energy from a plurality of wave-power units to be transferred via a simple common cable connected to the electric supply network on land. This offers a comprehensive solution where both the wave-power unit and the switchgear station can be constructed as standard modules using standard components. Besides being economic both in construction and in operation, a power plant in accordance with the invention also offers advantages from the environmental aspect since there is no need to build switchgear buildings in environmentally sensitive coastal areas.

In accordance with another preferred embodiment the system comprises a plurality of switchgear stations wherein each is connected to a number of wave-power units. Such an embodiment may sometimes be advantageous if the number of units is large.

In accordance with yet another preferred embodiment each switchgear station is connected to a receiving station arranged on land.

In accordance with yet another preferred embodiment at least one of the switchgear stations, normally all of them, comprises a step-up transformer. Alternatively, or as well, a step-up transformer is arranged in the intermediate station. Transmitting the energy at an increased voltage level achieves more favourable transmission both from the technical and the financial aspect.

In accordance with yet another preferred embodiment the switchgear stations and/or the intermediate station comprise(s) a converter. The voltage can thus be favourably transmitted as AC.

In accordance with yet another preferred embodiment the switchgear stations and/or the intermediate station comprise(s) means for storing energy. The system can then easily adjust the power supplied depending on fluctuations in available power and power required.

In accordance with yet another preferred embodiment the switchgear stations and/or the intermediate station comprise(s) filtering means for filtering outgoing and/or incoming current and voltage. The voltage supplied by generator units of the type in question may in many cases be unstable and may vary as to frequency and amplitude, as well as containing heterodyne frequencies. The arrangement of filtering means eliminates these defects or at least reduces them so that a clean voltage, free from disturbance, is transmitted to the network.

In accordance with yet another preferred embodiment the switchgear stations and/or the intermediate station is/are filled with a non-corrosive, buffered liquid. This prevents aggressive salt water from penetrating, and the components in the switchgear and intermediate stations are protected.

In accordance with yet another preferred embodiment a filter and/or a transformer is/are arranged after the inverter. This ensures that a clean, ideal voltage can be supplied and that it can be conveyed further to a transmission or distribution network with suitably stepped-up voltage.

In accordance with yet another preferred embodiment the filter and/or transformer is/are arranged on land.

This offers a more suitable solution from the plant and operating aspects than if these components were to be situated at sea.

In accordance with yet another preferred embodiment each wave-power unit is connected to the inverter via a cable arranged on or close to the sea or lake bed.

Since the cable is arranged close to the sea bed there is less risk than otherwise of it causing any disruption to the surroundings or being tampered with.

The advantageous embodiments of the claimed wave-power plant described above are defined in the subordinate claims to claim 32.

In a third aspect of the invention the objective set is achieved by the use of the claimed wave-power unit or the wave-power plant for generating electric power, thereby gaining advantages of the type indicated above.

The objective set is achieved in a fourth aspect of the invention in that a method of the kind described in the preamble to claim 45 comprises the special measures of making the rotor permanently magnetic and providing the stator with a winding forming a plurality of poles distributed in the direction of movement of the rotor.

In accordance with a preferred embodiment the claimed method is utilized while making use of the wave-power unit and the preferred embodiments thereof.

Advantages are thus gained equivalent to those described above for the wave-power unit and its preferred embodiments.

In accordance with another preferred embodiment the stator is placed directly on the sea/lake bed or on a base plate resting on the bed, and a recess is made in the sea bed centrally below the generator, the depth of the recess corresponding to the length of the rotor.

Placing the stator directly on the sea bed, via a base plate, offers the best possible stability for the unit and it is easy to secure it in place. Thanks to the central recess in the sea bed the rotor can move all the way through the stator so that all available kinetic energy is converted and made use of.

In accordance with yet another preferred embodiment the energy generated is conducted to a switchgear station, the components of which are arranged in a watertight container, which container is anchored in the sea bed.

The preferred embodiments of the claimed method described above are defined in the subordinate claims to claim 45.

From a fifth aspect of the invention the objective set is achieved in that a system of components for manufacturing a linear generator for a wave-power unit in accordance with the invention comprises the special feature that the components comprise a plurality of stator modules of standard, uniform type, which stator modules are suitable to be arranged in an optional number side by side distributed around the centre line of the rotor.

Thanks to the system claimed it is possible to build up linear generators of various heights and different cross-sectional dimensions, using one and the same type of basic component. The modular building principle on which the system is based thus greatly improves the chances of building financially competitive wave-power plants. Different conditions for different wave-power plants need not require tailor-made solutions for each individual case since the module solution allows for a simple fit.

In accordance with a preferred embodiment of the system claimed the components comprise a plurality of permanent magnets of standard, uniform type, which permanent magnets are suitable to be attached in an optional number to a rotor body in line one after the other in the direction of movement of the rotor and/or to be secured in an optional number to the rotor body side by side distributed around the centre line of the rotor, the permanent magnets being suited to the stator modules.

This embodiment goes further into the concept of modularization represented by the system claimed since the rotor can also be built up of standard components. The embodiment thus further accentuates the advantages associated with such a system.

The preferred embodiment of the system claimed described above are defined in the subordinate claims to claim 54.

Finally, from the sixth aspect of the invention the objective set is achieved in that a method of manufacturing a linear generator for a wave-power unit in accordance with the invention comprises the special measures of manufacturing the stator from stator modules of standard, uniform type, constructing the stator from a plurality of laminated stacks arranged evenly distributed side by side around the centre line of the rotor and in that each laminated stack is composed of one or more stator modules arranged in line one after the other in the direction of movement of the rotor.

The claimed method of manufacture exploits the possibilities of module-based manufacture offered by the claimed system and contributes corresponding advantages. Each module is suitably tested prior to the assembly.

In accordance with a preferred embodiment of the method of manufacture the rotor is manufactured from permanent magnets of standard type, a plurality of these being attached to a rotor body, evenly distributed side by side around the centre line of the rotor, and one or more of them being secured in line one after the other in the direction of movement of the rotor.

This embodiment of the manufacturing method claimed takes the modular construction principle even further and strengthens the advantages achieved thereby.

The preferred embodiment of the claimed manufacturing method described above is defined in the claim subordinate to claim 56.

The invention is described in more detail in the following detailed description of advantageous examples of the invention with reference to the accompanying drawings.

DESCRIPTION OF ADVANTAGEOUS EMBODIMENTS

Figure 1:
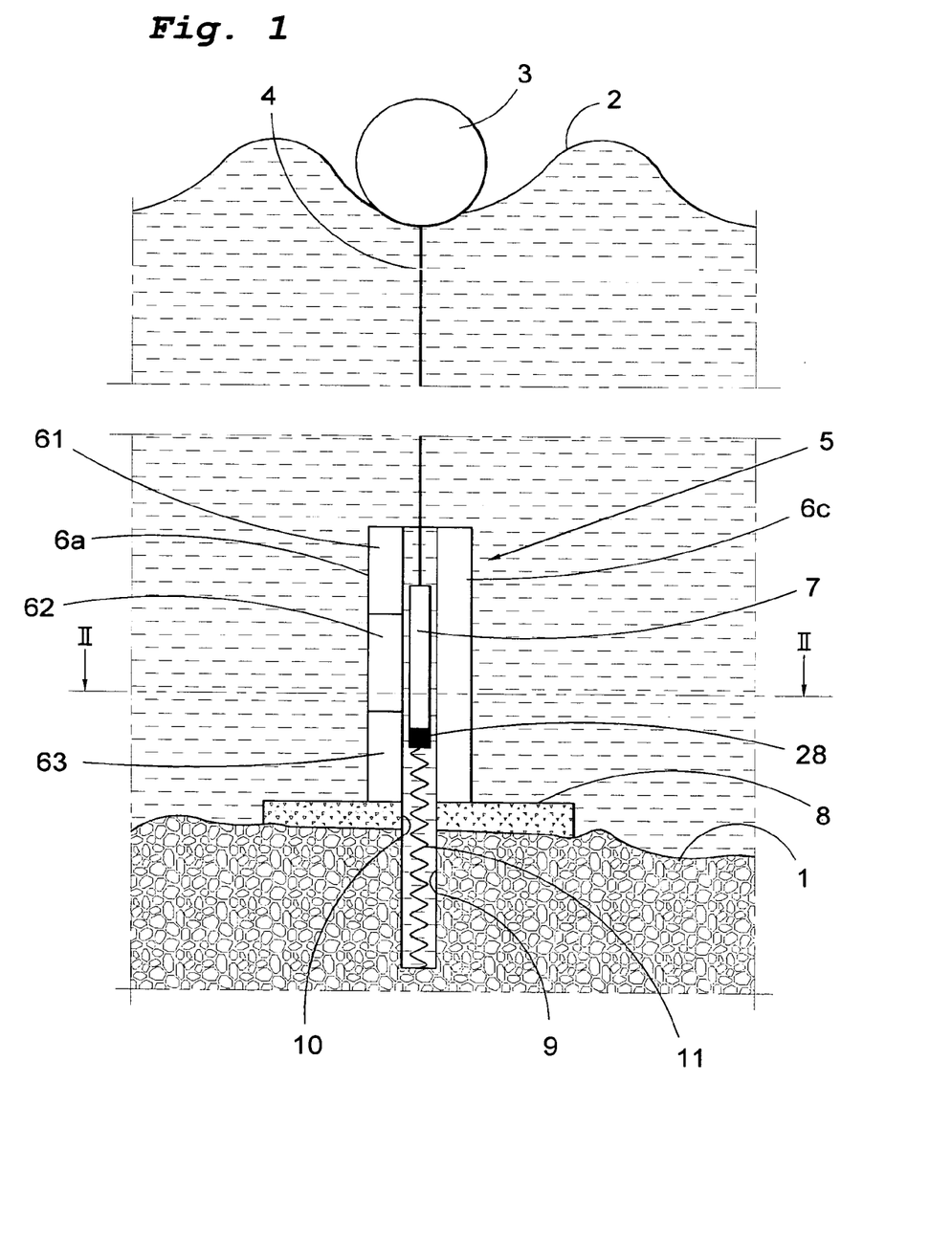
FIG. 1 is a schematic view from the side of a wave-power unit in accordance with the invention.

FIG. 1 illustrates the principle of a wave-power unit in accordance with the invention. A floating body 3 is arranged to float on the surface 2 of the ocean. Waves impart a to-and-fro vertical movement to the floating body 3. A linear generator 5 is anchored at the sea bed via a base plate 8 secured in the bottom. The plate may be of concrete. The stator 6a, 6c of the linear generator is secured to the base plate 8. The stator consists of four vertical pillar-like laminated stacks, only two of which are visible in the figure. The rotor 7 of the generator is arranged between the laminated stacks and is connected to the floating body 3 by a cable 4. The rotor 7 is of permanently magnetic material.

The base plate 8 has a centrally arranged hole 10 and, concentrically with this, a bottom recess 9 is made in the sea bed. The recess 9 may suitably be lined. A tension spring 11 is secured at the lower end of the recess 9 and the other end of the spring is attached to the lower end of the rotor 7. The diameter of the hole 10 in the base plate 8 and of the recess 9 is such that the rotor 7 can move freely through them.

Each laminated stack 6a, 6c is composed of a number of modules. In the example illustrated the laminated stack 6a is marked to indicate how it is divided into three vertically arranged modules 61, 62, 63, When the floating body 3 moves up and down due to the movement of the waves in the surface 2 of the ocean, this movement is transmitted via the cable 4 to the rotor 7 which thus acquires an equivalent to-and-from movement between the laminated stacks. Current is thus generated in the stator windings. The recess 9 permits the rotor to pass the whole stator in its downward movement. The tension spring 11 gives added force to the downward movement so that the cable 4 is kept taut at all times.

The spring may also be designed so that in certain situations it can also exert an upward force. The spring rate of the spring can be controlled by a control means 28 so that resonance is achieved for as much of the time as possible.

The stator is entirely or partially impregnated with VPI or silicon so that it can withstand the salt water.

Figure 2:
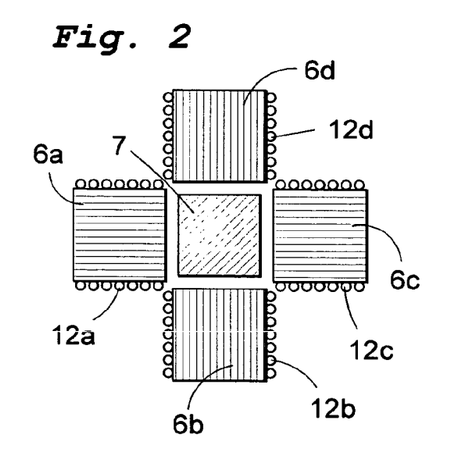
FIG. 2 is a section along the line II—II in FIG. 1.

FIG. 2 is a section along the line II—II in FIG. 1. In this example the rotor 7 has quadratic cross section and a laminated stack 6a–6d is arranged at each side of the rotor 7. 12a–12d designate the windings of respective laminated stacks. The orientation of the plates in each laminated stack is also clear from the figure. The air gap between the rotor and adjacent laminated stacks is in the order of some mm.

Figure 3:
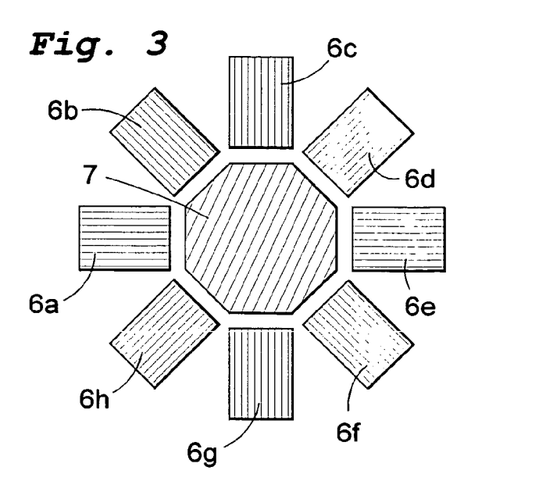
FIG. 3 is a section equivalent to that in FIG. 2, of an alternative embodiment.

In a corresponding section FIG. 3 illustrates an alternative embodiment in which the cross section of the rotor 7 is in the form of an octahedron and the number of laminated stacks is therefore eight.

It will be understood that the cross-sectional shape of the rotor may be a polygon with an optional number of sides. The polygon is preferably, but not necessarily, regular. The rotor may even be circular. By arranging laminated stacks facing in different directions all round the rotor, as much as possible of the magnetic field is utilized for inducing current.

Figure 4:
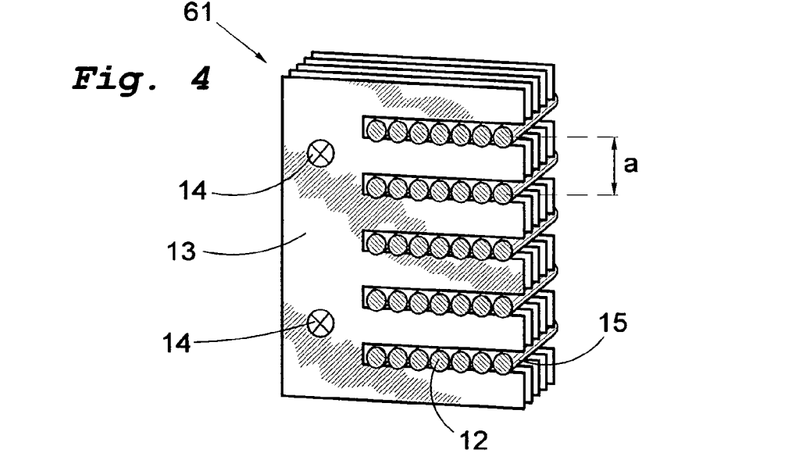
FIG. 4 is a view in perspective of a module of a laminated stack in accordance with the invention.

FIG. 4 shows one module 61 of a laminated stack in perspective. The modules consists of a stack of plates 13 held together by bolts 14 and provided with slots 15 for the winding 12. The pole distance a, i.e. the distance between the winding layers should be as small as possible in order to obtain as many poles as possible for a specific stator length, and thus a high frequency for the induced current. A practically suitable pole distance is about 8 mm, the slot width being about 4 mm and the plate tooth width consequently also being 4 mm.

A laminated stack may consist of one or more such modules. Each module normally has a plurality of poles, as shown in FIG. 4. However, modules with only one pole in each module are also an alternative.

Figure 5:
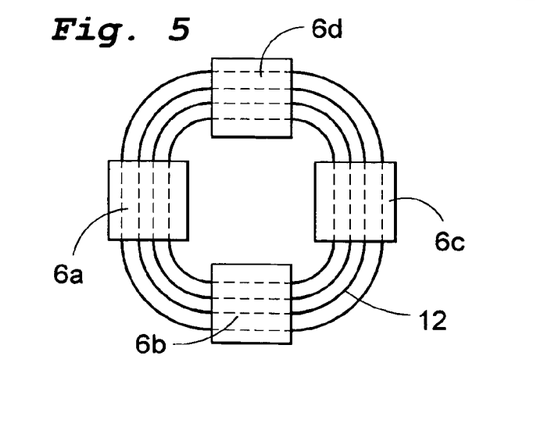
FIG. 5 is a section equivalent to that in FIG. 2, and illustrates an example of the stator winding.

The stator winding 12 may be common to the various laminated stacks 6a–6d, as illustrated in FIG. 5.

Figure 6:
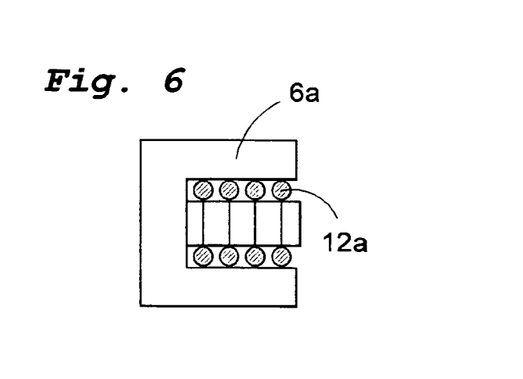
FIG. 6 is a view from the side of a module of a laminated stack in accordance with an alternative embodiment.

FIG. 6 illustrates an alternative in which each laminated stack has an individual winding. The Figure shows a module with two poles.

The insulation of the winding comprises a layer resistant to salt water, which can withstand a voltage up to 6 kV. The layer may be a polymer such as PVC or the like. Alternatively an enamelled wire may be used. The conductor consists of aluminium or copper.

Figure 7:
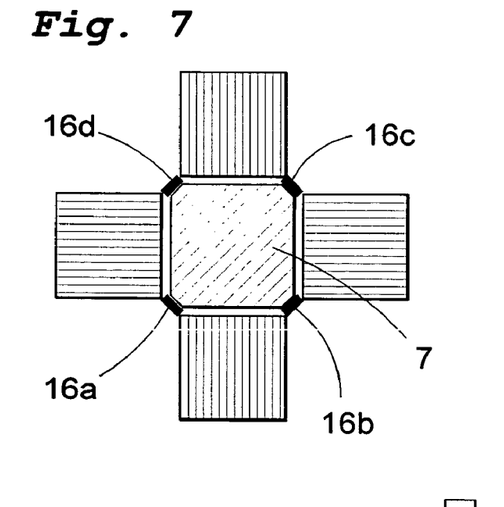
FIG. 7 is a section similar to that in FIG. 2, and illustrates a detail of the invention.

So that the air gap can be as small as possible it is important for the movement of the rotor 7 to be carefully controlled. FIG. 7, which is a schematic cross section through the linear generator, illustrates how this can be achieved in a simple and reliable manner. In this case the rotor has quadratic cross section with bevelled corners. A guide 16a–16d is arranged at each corner. Each guide is secured by its lower end to the base plate 8 (see FIG. 1) and extends vertically upwards, parallel with the laminated stacks 6a–6d. The four guides ensure exactly centred control of the rotor movement.

Figure 8:
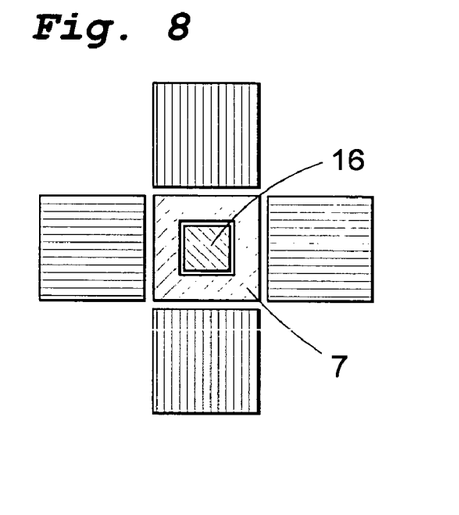
FIG. 8 shows an alternative example of a detail equivalent to that shown in FIG. 7.

An alternative embodiment is illustrated in FIG. 8. In this case the rotor 7 has a central, quadratic hole running longitudinally through it, in which a central guide 16 is arranged.

Figure 9:
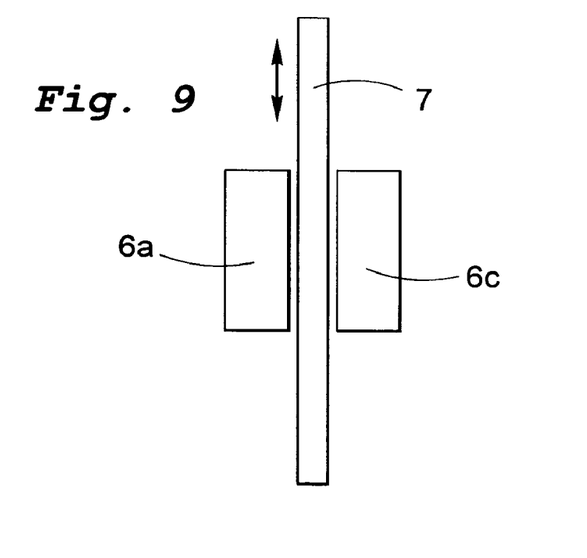
FIG. 9 is a schematic side view of the generator in accordance with an alternative embodiment.

The generator illustrated in FIG. 1 has a stator part that is approximately twice as long as the rotor. FIG. 9 shows an alternative embodiment in which, instead, the rotor 7 is approximately twice as long as the stator 6.

Figure 10:
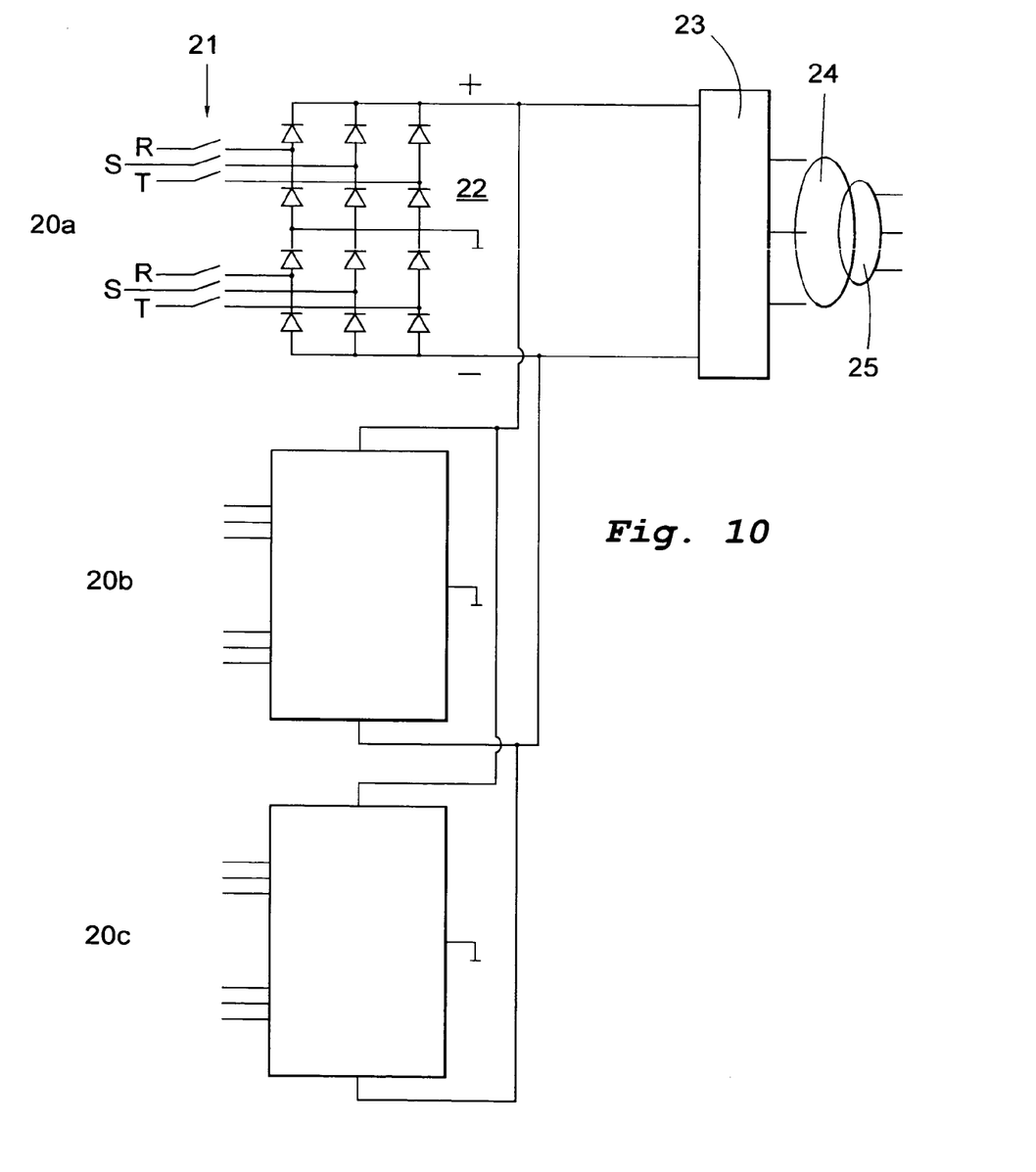
FIG. 10 is a diagram illustrating how a plurality of units in accordance with the invention are connected together to form a wave-power plant.
Figure 10A:
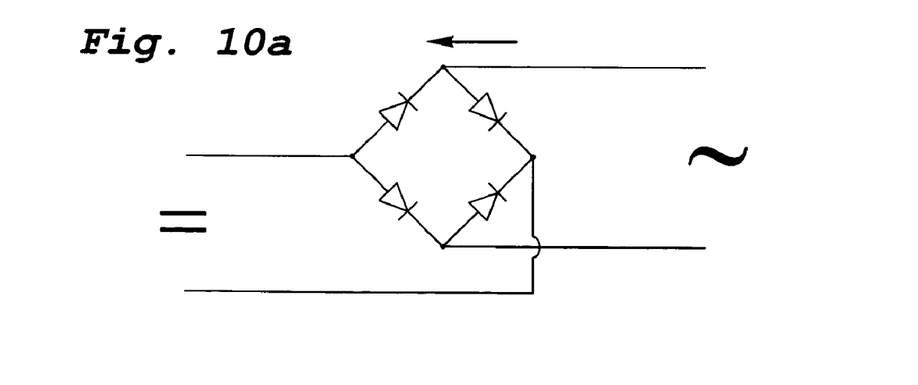

A wave-power plant in accordance with the invention consists of two or more units of the type described above. FIG. 10 illustrates how these are connected together to supply energy to an electric supply network. In the example shown the power plant consists of three units, symbolically designated 20a–20c. Each unit is connected via a breaker or contactor 21 and a rectifier 22 to an inverter 23 in a bipolar connection according to the figure. The circuit diagram is only drawn in for the unit 20a. It will be understood that the other units 20b, 20c are connected in corresponding manner. The inverter 23 supplies three-phase current to the electric supply network 25, possibly via a transformer 24 and/or a filter. The rectifiers may be diodes which may be controlled and of type IGBT, GTO or thyristors, comprise controlled bipolar components or not be controlled.

The voltages on the DC side may be connected in parallel or in series, or a combination of both.

Figure 11:
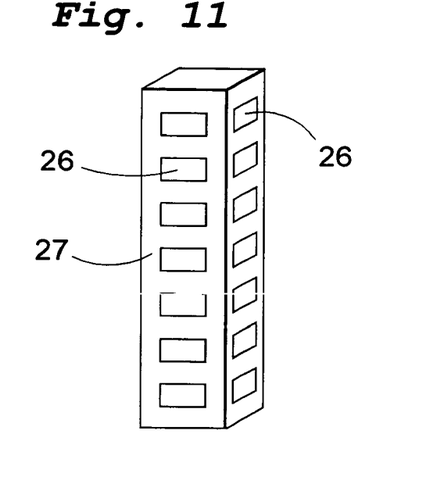
FIG. 11 is a view in perspective of a rotor in one embodiment of the invention.

The rotor 7, shown in perspective in FIG. 11, is provided with a number of permanent magnets 26 situated in a row on each side of the rotor body 27. In this example the rotor has four sides to cooperate with four laminated stacks.

The permanent magnets 26 can suitably have the same design for rotor configurations of various types, e.g. different lengths and different numbers of sides in circumference. The permanent magnets are then attached to a rotor body 27. The rotor body may also be of standard design or individually adjusted depending on how many sides the rotor is to have.

Figure 12:
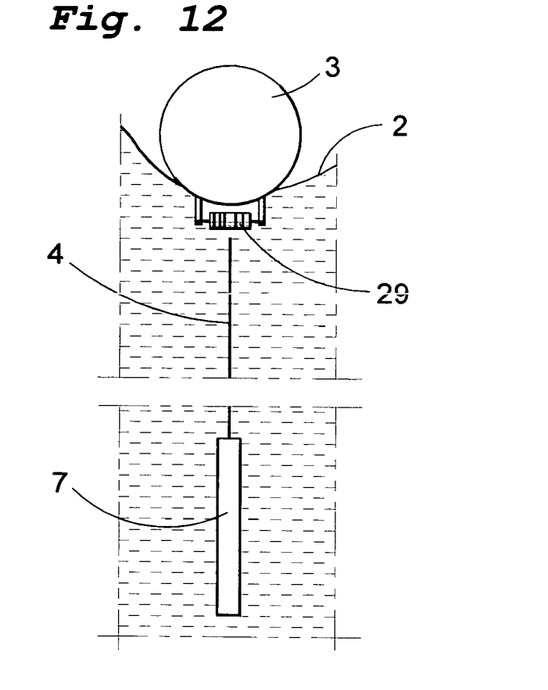
FIG. 12 illustrates a view from the side of a detail in a unit in accordance with one embodiment.

FIG. 12 illustrates how the cable 4 is provided with a control means to control its active length, i.e. the distance between the floating body 3 and the rotor 7. In this case the control means consists of a cylinder 29 attached to the floating body, onto which part of the cable can be wound. The control means may also be designed in some other way and alternatively arranged at the connection of the cable to the rotor or somewhere in the middle of the cable. The control means allows the length of the cable to be adjusted to different tidal water conditions. It can also be used to position the floating body just below the surface of the water. If the connection means is not a cable, e.g. a wire or chain or jointed rods, a control means suitable therefor should be used.

Figure 13:
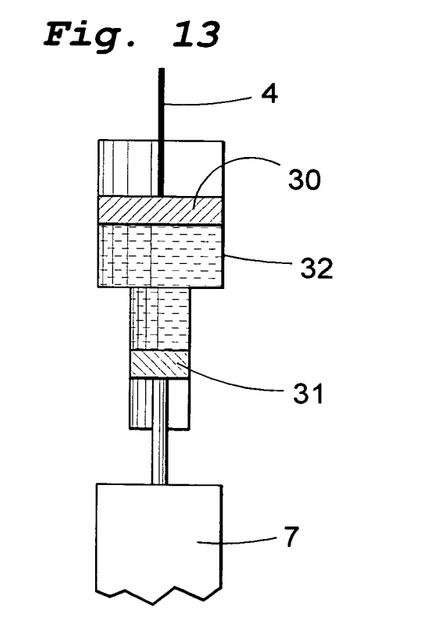
FIG. 13 illustrates another detail in a basic layout sketch.

FIG. 13 illustrates an embodiment in which the cable is connected to the rotor via a gear mechanism. In the example shown, the gear mechanism consists of a piston 30 secured to the cable and arranged to sealingly movement up and down in a container 32 filled with liquid, and of a piston 31 connected to the rotor 7 and similarly arranged to move up and down in the container 32. The piston 30 connected to the cable 4 and the part of the container 32 cooperating therewith, has greater diameter than the piston 31 connected to the rotor 7 and the part of the container 32 cooperating with it. The position of the container is suitably fixed. This arrangement produces a ratio between the vertical movement of the cable and the vertical movement of the rotor that corresponds to the area ratio between the pistons. The gear mechanism may alternatively be in the form of a link system, toothed gear drive, or with the aid of screws of different pitch. The gear mechanism can also be designed to permit adjustment of the gear ratio.

Figure 14:
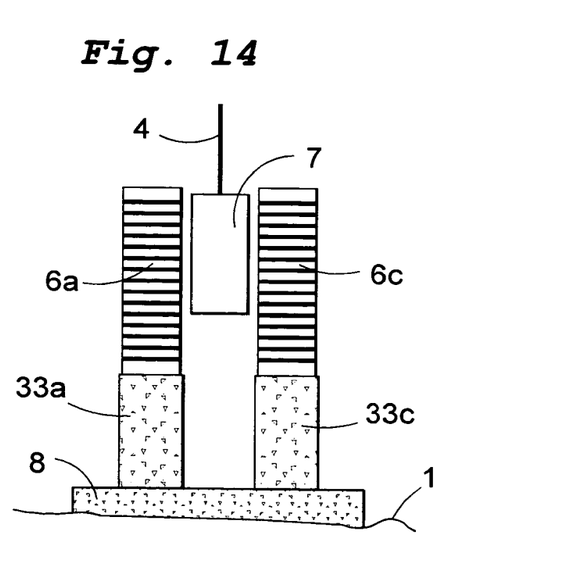
FIGS. 14–16 are side views of alternative embodiments of the linear generator in accordance with the invention.

In the embodiment shown in FIG. 14 each laminated stack 6a, 6c rests on a stand part 33a, 33c. Each stand part is secured to a base plate 8 resting on the sea bed 1. The height of the stand parts 33a, 33c is at least as great as the length of the rotor 7 so that this can pass the whole stator 6. The base plate 8 and stand parts 33a, 33c are suitably embedded in concrete and their mass should be some tens of tons.

Figure 15:
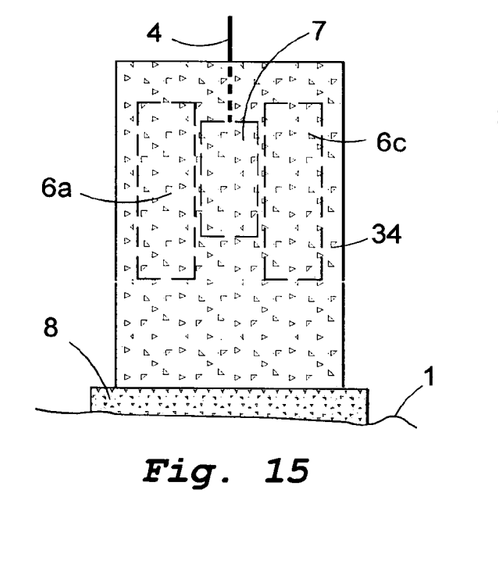

In the embodiment illustrated in FIG. 15 the entire linear generator is enclosed in a casing of concrete formed by the housing 34 and the base plate 8.

Figure 16:
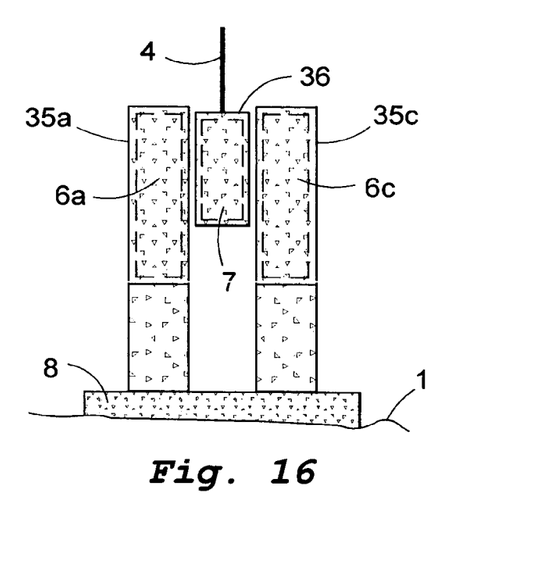

In the example in FIG. 16 the each laminated stack 6a, 6c is embedded in a concrete casing 35a, 35c. The rotor 7 is also enclosed in a concrete casing 36.

Figure 17:
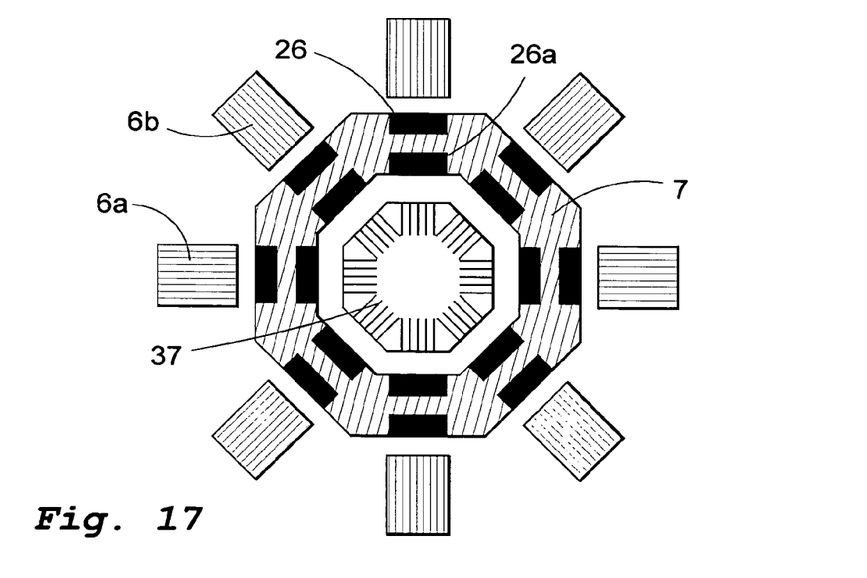
FIG. 17 is a section corresponding to the section II—II in FIG. 1, of an alternative embodiment of the linear generator.

FIG. 17 shows a cross section through an alternative embodiment of the linear generator. The rotor 7, in this case octagonal and hollow, has both outwardly directed permanent magnets 26 cooperating with each laminated stack 6a, 6b, etc., and inwardly directed permanent magnets 26a cooperating with an octagonal laminated stack arranged centrally inside the rotor 7.

Figures 18, 19, 20:
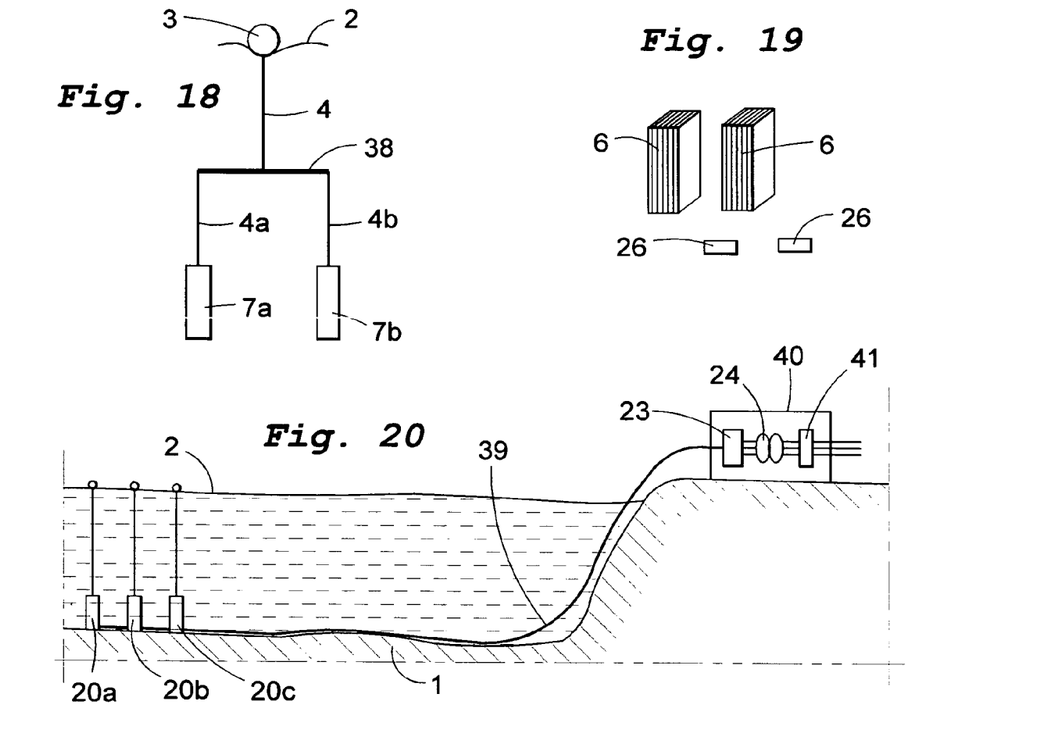
FIG. 18 is a view from the side of another alternative embodiment of a unit in accordance with the invention.
FIG. 19 illustrates a system of components in accordance with the invention.
FIG. 20 illustrates how the wave-power unit forms a wave-power plant and how it is connected to an electric supply network.

FIG. 18 illustrates an example in which a floating body 3 is common to the rotors 7a, 7b for two different linear generators. The cable 4 is connected to a horizontal rod 38 which is connected by cables 4a, 4b to each rotor 7a, 7b.

FIG. 19 illustrates a system of components with a number of identical stator modules 6 and a number of identical permanent magnets 26. A linear generator of optional length and cross section can be assembled using the components. Each module is suitably so designed that it can be tested as an individual component.

FIG. 20 illustrates a wave-power plant having several generators 20, 20b, 20c connected together. A rectifier is arranged at each generator and the DC current is conducted via cables 39 arranged on the sea bed, to a station on land provided with an inverter 23, a transformer 24 and a filter 41, from which electric power is supplied to a distribution or transmission network.

Figure 21:
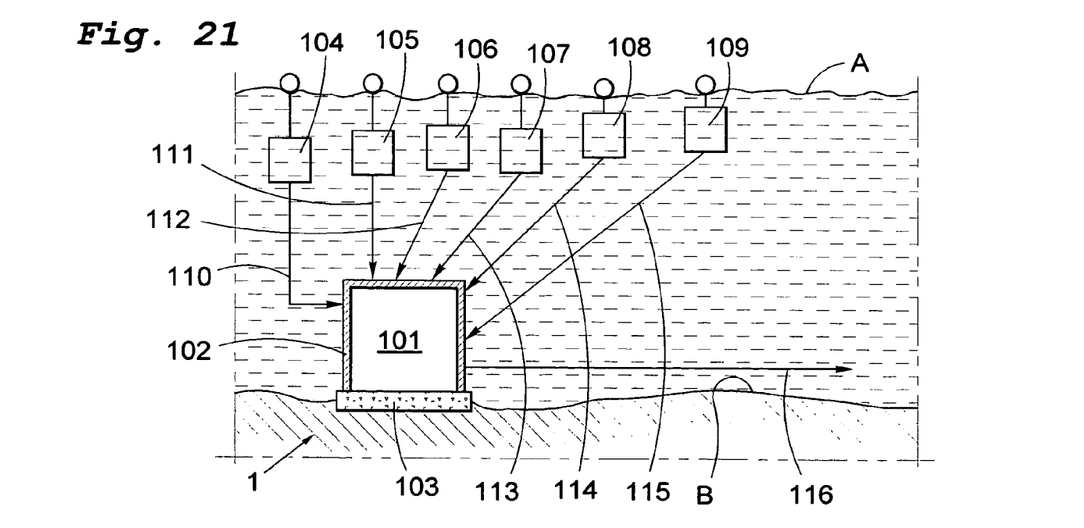
FIG. 21 illustrates a side view of the wave-power unit connected to a switchgear station.

FIG. 21 is a basic layout sketch illustrating another advantageous embodiment of the invention. A switchgear station is arranged resting on the sea bed B. The switchgear station 101 consists of a watertight container formed by a housing 102 and a bottom plate 103 which may be of concrete, for instance. The switchgear station 101 is anchored in the sea bed B. The generators 104–109 of a number of wave-power units are connected to the switchgear station.

Each generator unit 104–109 is electrically connected with the switchgear station 101 by cables 110–115, which, via lead-ins through the housing 102, are connected to the components inside the switchgear station. The voltage is supplied from each unit as low-voltage direct or alternating voltage.

The components in the switchgear station 101 are of conventional type and are not shown in the figures. These components may include semiconductors, converters, breakers, measuring devices, relay protection, surge diverters and other over-voltage protection devices, earthing means, load couplers or disconnectors, as well as transformers.

The switchgear station supplies an outgoing direct or alternating voltage, preferably high voltage, through outgoing cables 116. The alternating voltage has low frequency and may be three phase or multiphase. Standard frequencies such as 50 or 60 Hz may also be used.

The incoming low voltage is converted to outgoing high voltage by the transformer in the switchgear station. The converter or inverter in the switchgear station is used when necessary to converter DC-AC or vice versa.

The voltage is supplied to a receiving station located on land, possibly via an intermediate station, to be fed out on an electric supply network.

Figure 22:
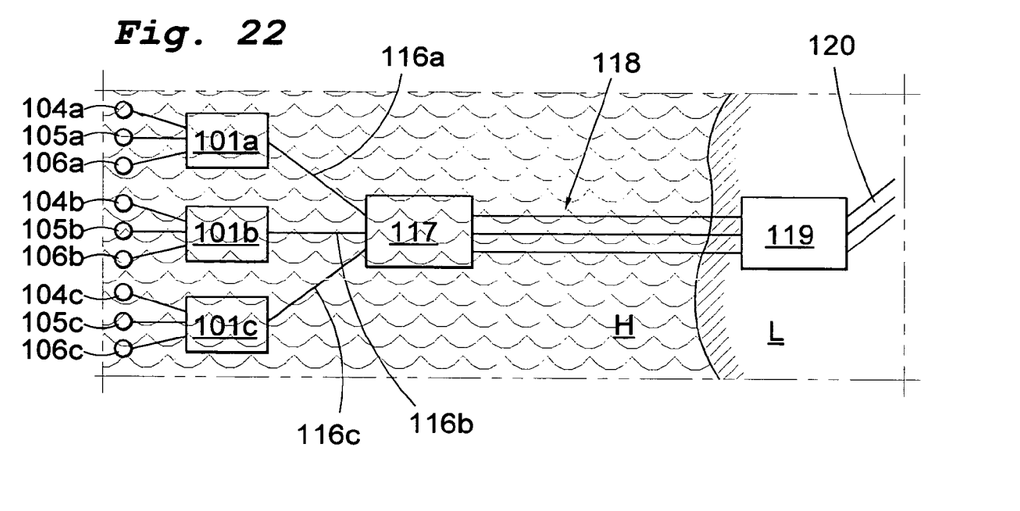
FIG. 22 illustrates an alternative method of connecting the wave-power unit to a supply network.

FIG. 22 illustrates an example of a system in accordance with the invention that may be expedient when a large number of generator units is included in the system. The figure is a symbolic representation of the system seen in bird's eye perspective and shows a sea area H on the left of the figure and a land area L on the right. The components on the left of the figure are located partly under and partly above the surface of the water.

The system comprises a first group of generator units 104a–106a, a second group of generator units 104b–106b and a third group of generator units 104c–106c. The generator units 104a–106a in the first group are connected via under-water cables to a first switchgear station 111a located below the surface of the water. Similarly, the two other groups of generators 104b–106b and 104c–106c are connected to a second switchgear station 111b and a third switchgear station 111c, respectively. Each of the switchgear stations 101a–101c is connected via under-water cables 116a–116c to an intermediate station 117, also located below the surface of the water. The voltage is conducted from the intermediate station 117 as low-frequency three-phase alternating voltage via under-water cables 118 to a receiving station 119 located on land. The voltage is converted in the receiving station to a standard frequency such as 50 or 60 Hz.

The distance between the generator units and the intermediate station may be from a kilometer or so up to many tens of kilometers. When the system is constructed as shown in FIG. 22 the distance between on the one hand switchgear station and intermediate station and on the other hand intermediate station and receiving station, can be optimized.

Figure 23:
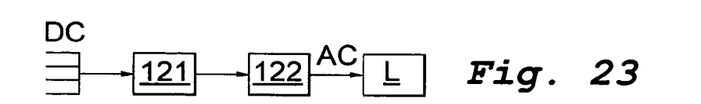
FIGS. 23–26 are charts illustrating various examples of converting the voltage in a power plant in accordance with the invention.
Figure 24:
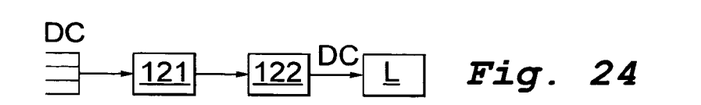

Transmission from the generator units to a receiving station on land may take place in various ways with various voltage conversions. FIGS. 23 to 26 illustrate schematically some examples of this. In each example the generator units are arranged to the left and the receiving station on land L to the right in the figures. 121 denotes a converter/inverter and 122 a step-up transformer. In FIGS. 23 and 24 the generator units supply direct voltage which in FIG. 23 is transmitted to land as alternating voltage and in FIG. 24 as direct voltage.

Figure 25:
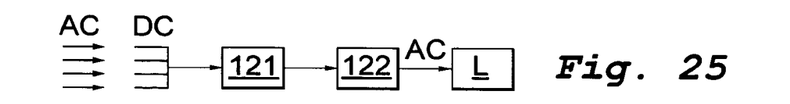
Figure 26:
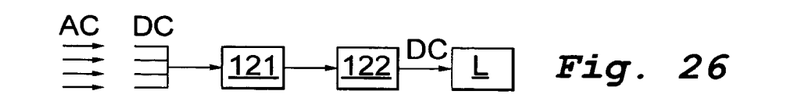

In FIGS. 25 and 26 the generator units supply alternating voltage which is converted to direct voltage. In FIG. 25 this is transmitted to land as alternating voltage and in FIG. 26 as direct voltage.

Figure 27:
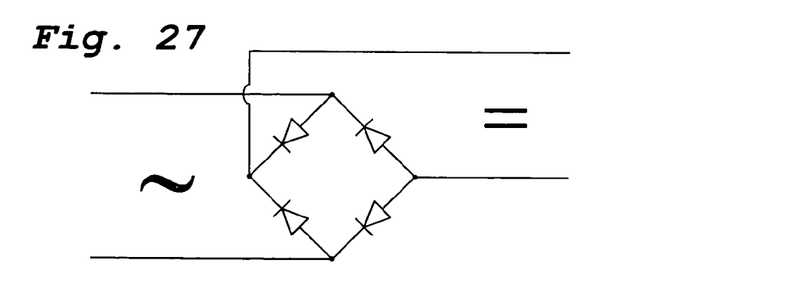
FIG. 27 illustrates an alternative rectifying example.

Many other alternatives are feasible within the scope of the invention. A whole-wave rectifier of the type illustrated in FIG. 27 may be used for instance.

Energy stores and filters may also be housed in each switchgear station 101 and/or in the intermediate station 117. The energy stores may consist of batteries, capacitors, SMES types, flywheels or combinations thereof, for instance. The filters may comprise active components in similar manner to the converters. Passive LC filters and electro-mechanical components such as flywheel converters or synchronous condensers are also possible.

The invention claimed is:

1. A wave-power plant comprising a plurality of wave power units positioned on a sea bed and being responsive to waves on the surface of a body of water for the production of electric power in response to wave action of the body of water comprising:

a floating body floating on the surface of the water, said body moving in response to the wave action; and an electric linear generator having a stator arranged to be fixedly anchored in the sea bed and, a permanent magnet rotor moveably mounted with respect to the stator, said rotor being operative for motion in a selected direction therein;

connection means for connecting the rotor to the floating body so that the rotor moves in the selected direction in response to the motion of the floating body, wherein the stator comprises a winding forming a plurality of poles distributed in the direction of movement of the rotor, the plant further comprising at least one inverter and at least one of a filter and a transformer arranged after the inverter, a rectifier connected between the winding and the inverter which is common to the plurality of wave-power units; and at least one electric switchgear station comprising a watertight container enclosing switchgear components, and which container is anchored to the seabed.

2. The wave-power unit as claimed in claim 1, wherein the rotor is vertically oriented.

3. The wave-power unit as claimed in claim 1, wherein the rotor comprises a plurality of permanent magnets distributed in the direction of movement of the rotor.

4. The wave-power unit as claimed in 1, wherein the poles are spaced apart by a distance seen in the direction of movement of the rotor in an amount less than about 50 mm.

5. The wave-power unit as claimed in 1, wherein the poles are spaced apart by a distance seen in the direction of movement of the rotor in an amount less than about 10 mm.

6. The wave-power unit as claimed in claim 1, wherein the stator comprises a plurality of laminated stacks distributed evenly around the rotor.

7. The wave-power unit as claimed in claim 6, wherein the rotor is shaped as a regular polygon having n sides and the number of laminated stacks is equal to the number of sides of the polygon.

8. The wave-power unit as claimed in claim 6, wherein each laminated stack comprises a plurality of modules arranged one after the other in the direction of movement of the rotor.

9. The wave-power unit as claimed in claim 6, wherein the rotor comprises a plurality of circumferentially distributed permanent magnets distributed around its circumference and so arranged that at least one permanent magnet faces towards each laminated stack.

10. The wave-power unit as claimed in claim 9, wherein the rotor comprises a rotor body on which the permanent magnets are mounted.

11. The wave-power unit as claimed in claim 1, wherein the rotor and stator each have a corresponding length, and wherein the length of the rotor and the length of the stator differ from each other.

12. The wave-power unit as claimed in claim 11, wherein the length of the rotor is longer than length of the stator.

13. The wave-power unit as claimed in claim 1, wherein one or more guide elements are arranged to control the rotor.

14. The wave-power unit as claimed in claim 1, wherein at least a part of the connection means is flexible.

15. The wave-power unit as claimed in claim 14, wherein the connection means comprises at least one of a cable, a wire and a chain.

16. The wave-power unit as claimed in claim 14, further comprising spring means arranged to exert a force on the rotor.

17. The wave-power unit as claimed in claim 16, wherein the spring means has an adjustable spring rate.

18. The wave-power unit as claimed in claim 1, wherein the connection means has an adjustable length.

19. The wave-power unit as claimed in claim 1, further comprising a gear mechanism for establishing a gear ratio between the movement of the floating body and the rotor.

20. The wave-power unit as claimed in claim 19, wherein the gear mechanism is located between the connection means and the rotor.

21. The wave-power unit as claimed in claim 1, wherein the bed comprises a base plate.

22. The wave-power unit as claimed in claim 21, including a stand for supporting the stator on the base plate.

23. The wave-power unit as claimed in claim 22, wherein the base plate has a central free space of sufficient cross-sectional dimensions to permit the rotor to enter the space, and which space is at least as high as the length of the rotor.

24. The wave-power unit as claimed in claim 22, including a watertight housing for enclosing the generation.

25. The wave-power unit as claimed in claim 24, wherein the connection means extends into the housing and a through opening is provided with a seal or bellows.

26. The wave-power unit as claimed in claim 24, wherein the housing is filled with a liquid.

27. The wave-power unit as claimed in claim 24, wherein the base plate, stand and housing are formed of concrete.

28. The wave-power unit as claimed in claim 21, wherein at least one of the stator and the rotor is at least partially embedded in a solid material.

29. The wave-power unit as claimed in claim 28, wherein material comprises concrete.

30. The wave-power unit as claimed in claim 1, wherein the rotor is hollow and includes permanent magnets directed both outwardly and inwardly, and laminated stacks arranged on the outside and the inside of the rotor.

31. The wave-power unit as claimed in claim 1, wherein the floating body is connected by the connection means to the rotor of each of a plurality of linear generators.

32. The wave-power unit as claimed in claim 1, wherein the stator includes windings and a rectifier coupled to the windings, the rectifier being located proximate to the linear generator and below the surface of the water when in use.

33. The wave-power unit as claimed in claim 1, wherein the generator produces voltage of varying frequency.

34. The wave-power unit as claimed in claim 1, wherein the generator supplies multiphase current.

35. The wave-power unit as claimed in claim 1, wherein a plurality of switchgear stations are connected to the wave-power plant, each switchgear station being connected to a plurality of the wave-power units.

36. The wave-power plant as claimed in claim 1, wherein each switchgear station is connected to a receiving station arranged on land.

37. The wave-power plant as claimed in claim 1, wherein at least one of the switchgear stations includes a step-up transformer or an intermediate station including a step-up transformer.

38. The wave-power plant as claimed in claim 1, wherein at least one of the switchgear stations or the intermediate station includes a converter.

39. The wave-power plant as claimed in claim 1, wherein at least one of the switchgear stations or the intermediate station comprises means for storing energy.

40. The wave-power plant as claimed in claim 1, wherein at least one of the switchgear stations or the intermediate station comprises filtering means for filtering outgoing or incoming current and voltage.

41. The wave-power plant as claimed in claim 1, wherein at least one of the switchgear stations or the intermediate stations is filled with non-corrosive, buffered liquid.

42. The wave-power plant as claimed in claim 1, wherein the inverter, filter and transformer are arranged on land.

43. The wave-power plant as claimed in claim 42, wherein each-wave-power unit is connected to the inverter via a cable arranged proximate to the sea or lake bed.

44. The method for generating electric power on a sea bed comprising the steps of:
  assembling a plant including a plurality of wave power units;
  positioning each wave power unit on the sea bed, each including an electric linear generator having a permanent magnet rotor, a stator winding;
  connecting a floating body to the rotor of the electric linear generator, each floating body being responsive to wave motion so that the rotor connected thereto moves in a selected direction in response to motion of the floating body;
  anchoring the stator of the generator in the sea or lake bed;
  distributing a plurality of poles in the direction of movement of the rotor;
  forming the winding into a plurality of poles;
  distributing the poles in the direction of movement of the rotor;
  arranging at least one inverter and at least one filter and transformer after the inverter;
  connecting a rectifier between the windings and the inverter which is common to the plurality of wave-power units; enclosing at least one electric switch gear in a water tight container; enclosing the switch gear components; anchoring the container to the sea bed and connecting the at least one electric switchgear to the plant.

45. The method as claimed in claim 44, wherein the stator is placed directly on the sea or lake bed or on a base plate resting on the bed, and a recess is formed in the sea bed centrally below the generator, the depth of the recess corresponding to the length of the rotor.

46. The method as claimed in claim 44, wherein the switchgear station is enclosed in a receiving station arranged on land.

47. The method as claimed in claim 46, including connecting switchgear stations to a common intermediate station, which intermediate station is connected to the receiving station.

48. The method as claimed in claim 44, wherein at least one of the switchgear stations and the intermediate station is arranged below the surface of the water proximate to the sea bed.

49. The method as claimed in claim 44, wherein voltage generated is step-up transformed in at least one of the switchgear stations and the intermediate station.

50. The method as claimed in claim 44, wherein the outgoing voltage from at least one of the switchgear stations and from the intermediate stations is alternating voltage.

51. A wave-unit positioned on a sea bed and being responsive to waves on the surface of a body of water for the production of electric power in response to wave action of the body of water comprising:

a floating body floating on the surface of the water, said body moving in response to the wave action; and an electric linear generator having a stator arranged to be fixedly anchored in the sea bed and, a permanent magnet rotor moveably mounted with respect to the stator, said rotor being operative for motion in a selected direction therein, connection means for connecting the rotor to the floating body so that the rotor moves in the selected direction in response to the motion of the floating body, wherein the stator comprises a winding forming a plurality of poles distributed in the direction of movement of the rotor; and wherein the rotor is hollow and includes permanent magnets directed both outwardly and inwardly, and laminated stacks arranged on the outside and the inside of the rotor.

* * * * *